(12) United States Patent
Chen

(10) Patent No.: US 10,322,766 B2
(45) Date of Patent: Jun. 18, 2019

(54) SELF-BALANCING TRANSPORTATION DEVICE WITH ANGULAR MOVEMENT OF FOOT PLATFORM

(71) Applicant: Shane Chen, Camas, WA (US)

(72) Inventor: Shane Chen, Camas, WA (US)

( * ) Notice: Subject to any disclaimer, the term of this patent is extended or adjusted under 35 U.S.C. 154(b) by 0 days.

(21) Appl. No.: 15/462,778

(22) Filed: Mar. 17, 2017

(65) Prior Publication Data

US 2017/0267306 A1    Sep. 21, 2017

Related U.S. Application Data

(60) Provisional application No. 62/309,935, filed on Mar. 17, 2016.

(51) Int. Cl.
*B62K 11/00* (2006.01)
*B62K 1/00* (2006.01)

(52) U.S. Cl.
CPC .............. *B62K 11/007* (2016.11); *B62K 1/00* (2013.01); *B62K 2201/00* (2013.01); *B62K 2207/00* (2013.01)

(58) Field of Classification Search
CPC .... B62K 11/007; B62K 1/00; B62K 2201/00; B62K 2207/00
USPC ........................................................ 180/6.6
See application file for complete search history.

(56) References Cited

U.S. PATENT DOCUMENTS

| 8,584,782 B2* | 11/2013 | Chen ............................ 180/218 |
| 8,684,123 B2* | 4/2014 | Chen .................... B62K 11/007 180/218 |
| 8,738,278 B2* | 5/2014 | Chen .................... B62K 11/007 180/218 |
| 8,807,250 B2* | 8/2014 | Chen ........................ B62K 1/00 180/21 |
| 9,452,802 B2* | 9/2016 | Ying .................... B62D 51/001 |
| 9,789,924 B2* | 10/2017 | Kroymann ............. B62K 13/04 |
| 9,957,006 B2* | 5/2018 | Tinaphong ............... B62H 1/12 |
| 9,957,011 B2* | 5/2018 | Jiang .................... B62K 11/007 |
| 2005/0241864 A1* | 11/2005 | Hiramatsu ........... A63C 17/004 180/7.1 |
| 2013/0228385 A1* | 9/2013 | Chen ..................... B62K 3/007 180/6.5 |
| 2015/0096820 A1* | 4/2015 | Strack .................. B62K 11/007 180/181 |
| 2015/0353158 A1* | 12/2015 | Chang .................... B62K 3/002 180/6.5 |
| 2017/0120139 A1* | 5/2017 | Ma ........................ B62K 11/007 |

(Continued)

FOREIGN PATENT DOCUMENTS

CN      104527878 A  *  4/2015
GB       2538108 A  * 11/2016  ............... B62K 1/00

*Primary Examiner* — Jacob D Knutson
(74) *Attorney, Agent, or Firm* — Steven J. Sullivan

(57) ABSTRACT

A self-balancing transportation device having improved shock absorbing ability and operation. Several embodiments are disclosed including a single wheel or wheel structure device with foot platforms disposed for angular movement about an axis of rotation that is non-collinear with the axis of rotation of the drive wheel. Single and multiple wheel devices are disclosed as well as devices having independently movable foot platforms, and devices having load platforms that rotate independently and are movable longitudinally with respect to one another, among other embodiments.

15 Claims, 6 Drawing Sheets

(56) References Cited

U.S. PATENT DOCUMENTS

2017/0233023 A1\* 8/2017 Chen .................... B62K 11/007
 280/63

\* cited by examiner

SELF-BALANCING TRANSPORTATION DEVICE WITH ANGULAR MOVEMENT OF FOOT PLATFORM

CROSS REFERENCE TO RELATED APPLICATIONS

The present application claims the benefit of provisional application No. 62/309,935, filed Mar. 17, 2016, for an Angular Suspension System for Self-Balancing Vehicles by the inventor herein.

FIELD OF THE INVENTION

The present invention relates to self-balancing transportation devices and, more specifically, to suspension in such devices.

BACKGROUND OF THE INVENTION

Various prior art self-balancing devices are known. They include the Segway (disclosed in U.S. Pat. No. 6,302,230, among others), the Hovertrax or hoverboard (disclosed in U.S. Pat. No. 8,738,278), and the Solowheel (disclosed in U.S. Pat. No. 8,807,250). These devices contribute to the art of fore-aft self-balancing vehicles and are hereby incorporated by reference.

A problem exists in providing suspension in these devices. Conventional suspension, for example, a typical automobile suspension system, involves a vertical shaft and a spring the biases against depression of the vertical shaft. There is a certain amount of horizontal displacement with this up-down movement of the vertical shaft and spring. This movement is inconsequential for the function of vertical suspension, but it is consequential with respect to shifting force and/or weight horizontally.

Since device driving and control in a self-balancing device depends on fore-aft weight distribution, subtle weight or force changes horizontally, i.e., fore-aft, will influence the control and driving of the vehicle.

Thus, a need exists to provide appropriate, effective and cost-efficient suspension in self-balancing vehicles.

SUMMARY OF THE INVENTION

Accordingly, it is an object of the present invention to overcome the shortcomings of the prior art.

It is another object of the present invention to provide a self-balancing transportation device with enhanced suspension.

It is also an object of the present invention to provide a self-balancing transportation device with rotational and/or angular displacement of the load support surface when a shock inducing force is applied to the device.

These and related objects of the present invention are achieved by use of a self-balancing transportation device with angular movement of foot platform as described herein.

The attainment of the foregoing and related advantages and features of the invention should be more readily apparent to those skilled in the art, after review of the following more detailed description of the invention taken together with the drawings.

DETAILED DESCRIPTION

Figure 1:
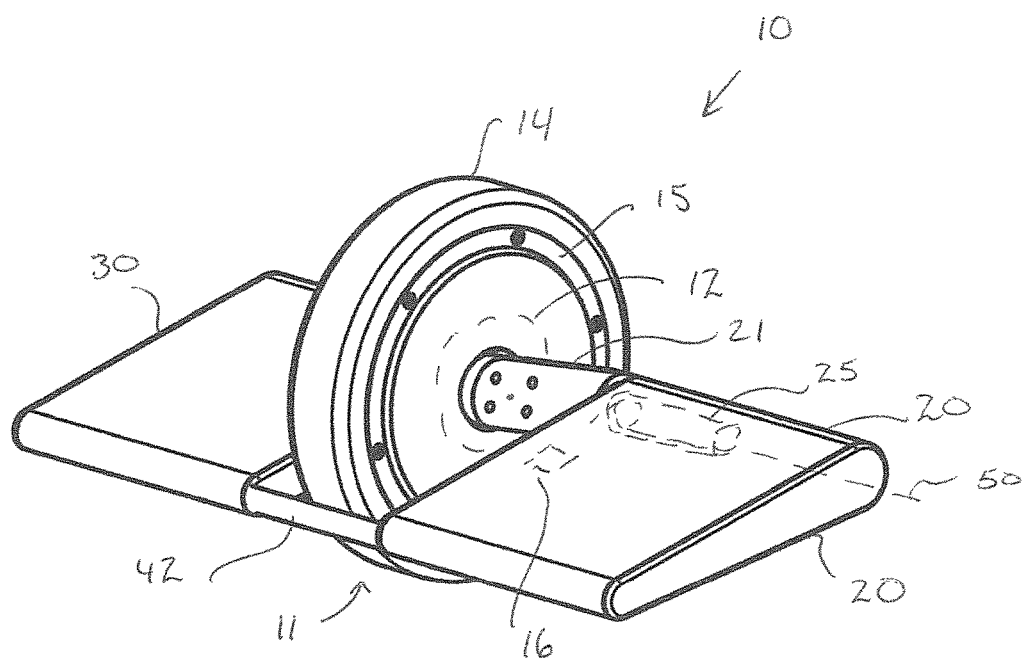
FIG. 1 is a perspective view of a self-balancing transportation device having suspension in accordance with the present invention.

Referring to FIG. 1, a perspective view of one embodiment of a self-balancing transportation device 10 with suspension in accordance with the present invention is shown.

Device 10 preferably includes a wheel 11 having a tire 14 mounted on rim 15, and two foot platforms 20,30 located on opposite sides of the wheel and rigidly connected to each other by platform coupling member 42. Device 10 is configured for self-balancing operation. A position sensor 16, preferably a gyroscopic sensor and/or accelerometer, may be provided on or in the foot platforms. The self-balancing system may include position sensor 16, an electronic control circuit, a battery and a drive motor 12. The battery and control circuit may be located on the wheel frame and/or within the wheel housing or within the foot platforms or otherwise situated. These components and their use and implementation are known in the art.

Device 10 preferably has two platform attachment arms 21,31 (only 21 is visible in the perspective of FIG. 1, yet 31 is symmetrically arranged with 21) that are fixedly coupled to a shaft upon which wheel 11 rotates. In the orientation of FIG. 1, these arms extend forward and downward from the center of wheel 11 (i.e., from the axis of rotation of the wheel). Foot platforms 20,30 are preferably coupled near the end of arms 21,31, respectively.

The foot platforms 20,30 are preferably coupled to their respective arms with a shaft and torsion spring assembly 25. This assembly provides lateral support along the front of the foot platform while allowing the platform to rotate along axis 50 when a sufficient force is applied counter to the torsion spring. This rotation provides suspension and, accordingly, the strength of the torsion spring may be selected with the weight range of an intended rider in mind (child, adult, etc). The spring strength is preferably sufficient to provide a secure, predictable platform position to a rider, while also allowing shock absorbing movement when an external potentially destabilizing force is applied to the wheel.

The device's self-balancing systems maintain a substantially level orientation of the foot platforms relative to horizontal, while the foot platforms undergo angular movement relative to the wheel. The angular platform movement provides suspension without the horizontal or fore-aft play associated with vertical suspension, thus delivering better operator control of the device.

While FIG. 1 illustrates platform arms 21,31 extending forward, thus positioning axis 50 forward of the axis of rotation of wheel 11, alternatively, axis 50 (and hence the orientation of arms 21,31) may be positioned rearward of the axis of wheel 11. Axis 50 and the axis of rotation of wheel 11 are preferably parallel to one another.

Figure 2:
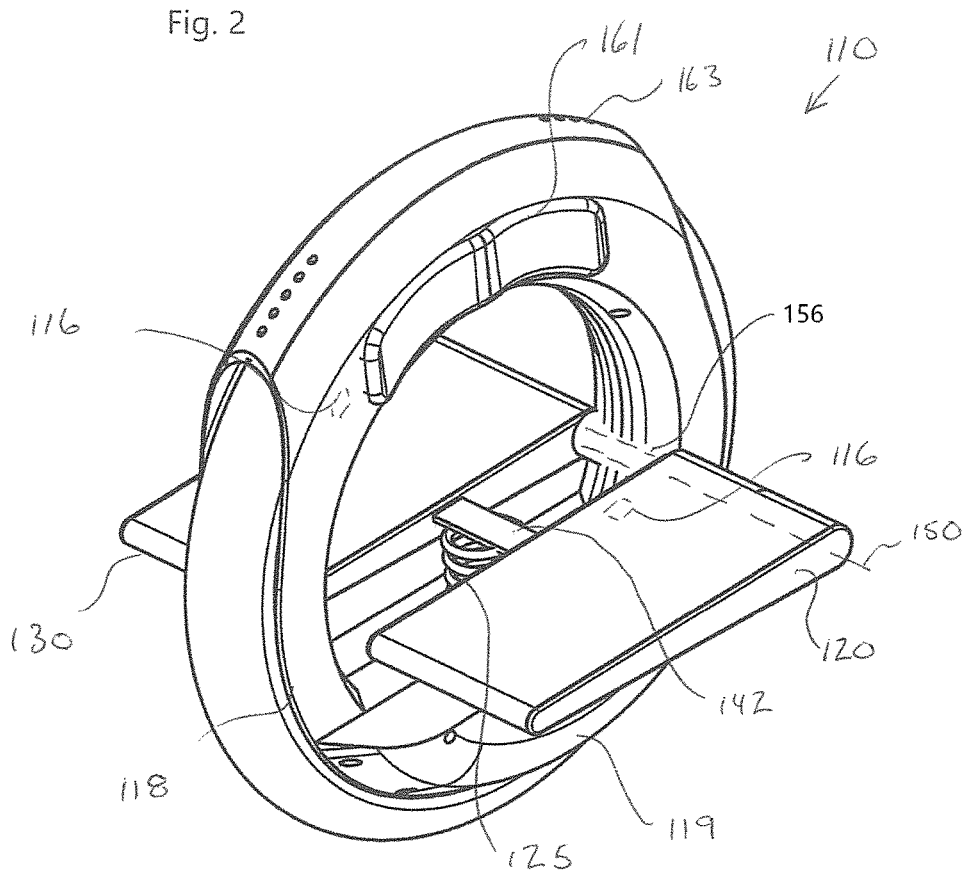
FIGS. 2-3 are perspectives view of another embodiment of a self-balancing transportation device with suspension in accordance with the present invention.
Figure 3:
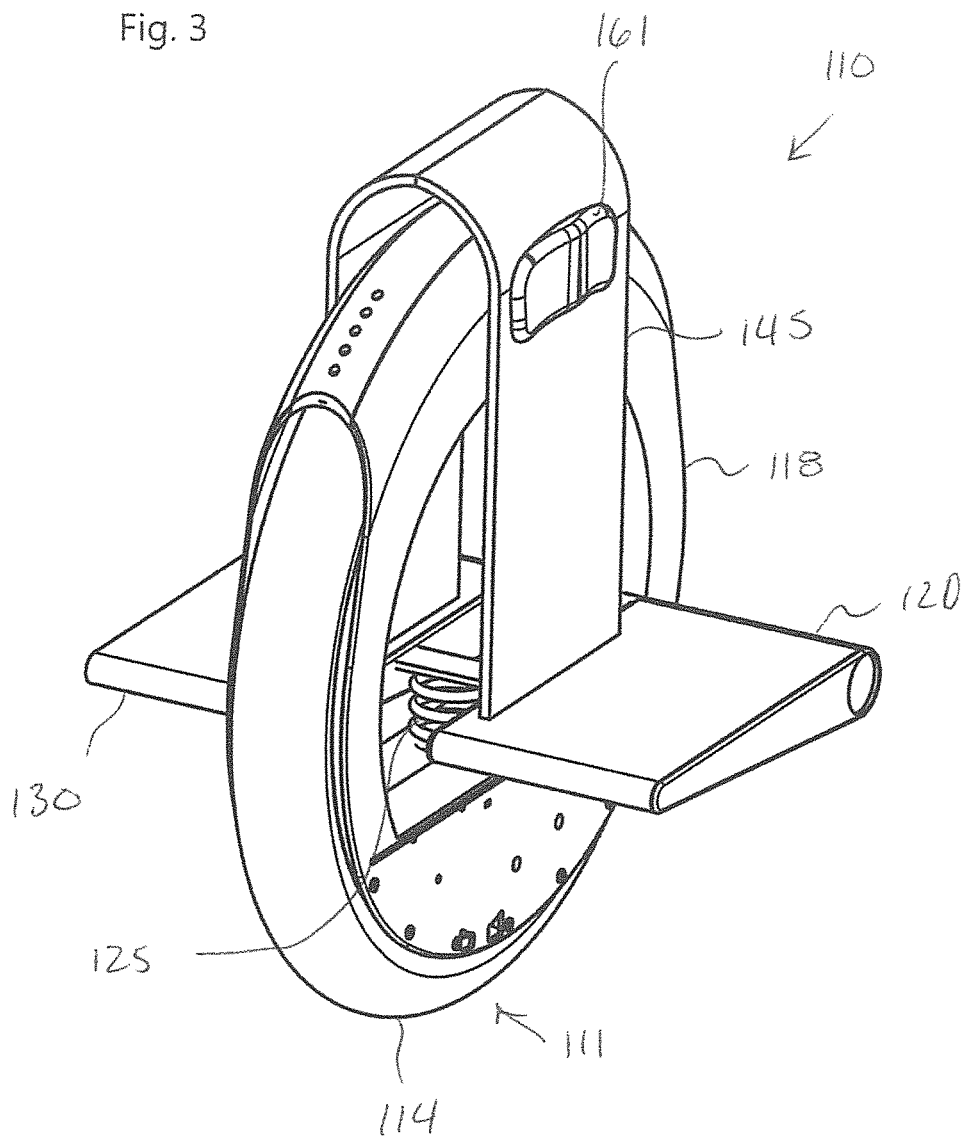

Referring to FIGS. 2-3, perspectives view of another embodiment of a self-balancing transportation device 110 with suspension in accordance with the present invention is shown.

Device 110 includes a wheel 111 and two foot platforms 120,130 located on opposite sides of the wheel. A housing 118 may cover portions of wheel 111. Foot platforms 120, 130 are preferably coupled to the housing/frame at pivot 156. The platforms and pivot are preferably configured such that the platforms rotate about axis 150. Coupling member 142 may fixedly connect the two platform sections and be situated above coil spring 125 that provides suspension.

A bottom housing section 119 may be located below the platforms. This housing may encase the drive motor, battery and a control circuit. Position sensor 116 is provided on or in platforms 120,130 or in a part of the vehicle not movable relative to platforms 120, 130 as discussed above for device 10.

Axis 150 is preferably below the axis of rotation of wheel 111. While axis 150 is shown forward of (to the right) and below the axis of wheel rotation, it may alternatively be place rearward.

FIG. 2 discloses leg contact member 161. These may be forms, pads or other structure/materials that provide cushion, positioning and/or enhance friction, or other, to a rider's lower leg. Indicator and/or pathway lights 163 may also be provided. Leg contact members and lights are known in the art.

FIG. 3 illustrates device 110 yet with the bottom housing removed or compressed and a movable leg contact support 145 mounted to the platforms and arranged to move with the platforms during a suspension event. In this manner, contact of the rider's lower legs with the leg contact members is not significantly altered by a shock force.

FIGS. 1-3 illustrate single wheel devices. It should be recognized that while one tire 14 is shown on rim 15, two or more tires (providing, for example, enhance lateral stability) could be provided on rim 15 or on multiple rims that are coupled together. These arrangements may be referred to as a "single wheel structure" because although there is more than one tire, they operate similar to a single wheel, for example, similar to a single wheel with a wider tire.

It should also be recognized that position sensor(s) could detect side-to-side tilt. This measure may be used to affect the driving of wheel 11,111, for example, reducing speed as a rider leans into a turn, etc.

It should further be noted that different drive motor arrangements may be used without departing from the present invention. For device 10 of FIG. 1, a hub motor may be a suitable motor, while for device 110 of FIG. 2, a friction-drive motor (located below the foot platforms) or other motor may be used. Various motor arrangements are known in the art.

Figure 4:
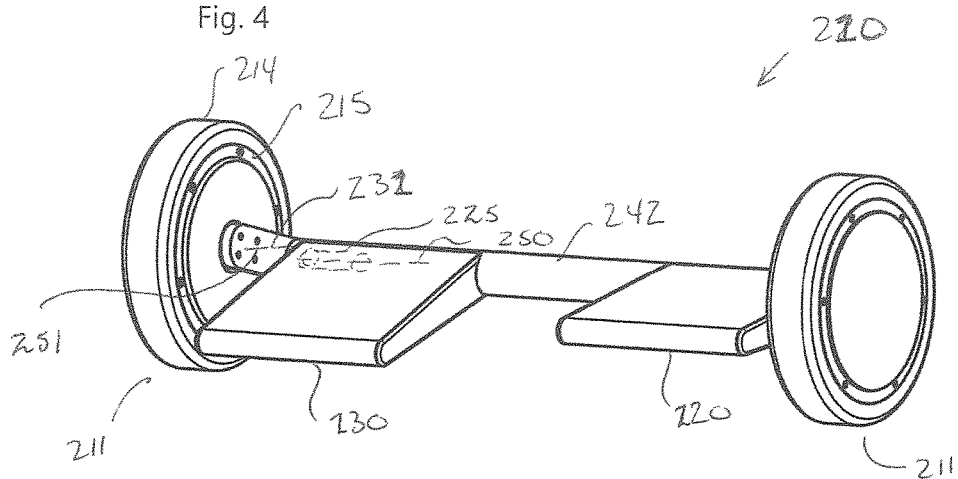
FIGS. 4-5 are also perspectives view of another embodiment of a self-balancing transportation device with suspension in accordance with the present invention.
Figure 5:
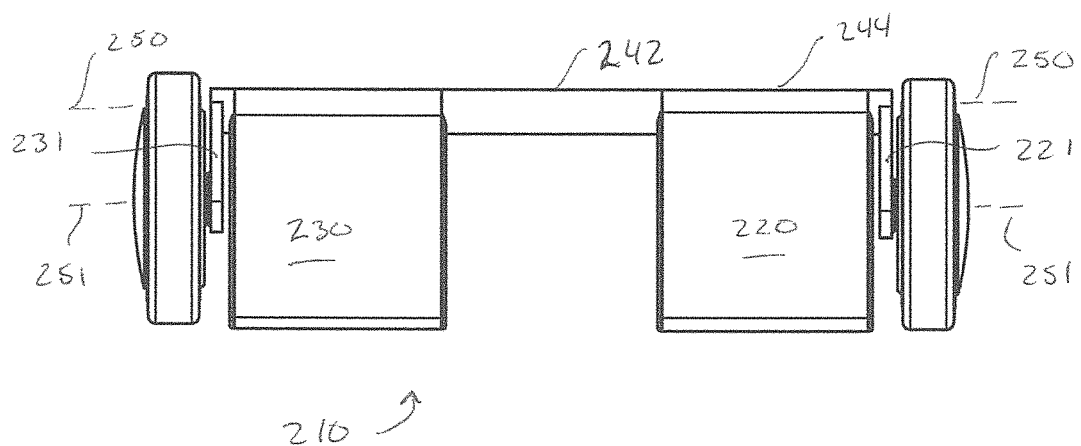

Referring to FIGS. 4-5, perspective views of another embodiment of a self-balancing transportation device 210 with suspension in accordance with the present invention are shown.

Device 210 preferably includes two wheels 211 that may be configured in the same or similar manner as wheel of FIG. 1. Accordingly, wheels 211 include a motor, position sensor, electronic control circuit (separate or shared) and a battery (separate or shared). Each wheel preferably has an associated platform 220,230 and each platform is coupled through an attachment arm 221,231, respectively. These components are preferably configured as their counterparts in wheel 11. Thus, arms 221,232 extend forward of the axis of rotation 251 of the wheel and couple through a shaft and torsion spring assembly 225 to their respective platforms. The shaft and torsion spring assembly establishes an axis of rotation 250 for each foot platform.

A connecting rod or shaft 242 preferably joins the two foot platforms 220,230 in a manner that maintains a coaxial relationship and provides fore-aft rotation of the individual foot platforms. Connecting rod 242 may also serve as a handle.

With two independently movable foot platforms, a rider may turn device 210 by applying more drive (i.e., platform rotation) to one wheel, and spin device 210 by applying opposing forces, as is the case with devices of the '278 patent discussed above.

FIGS. 4-5 illustrate more forward lean on platform 220. FIGS. 4-5 also illustrate a relationship of the platform axes of rotation 250 and the wheel axes of rotation 251. Again, the platform axis is preferably forward or rearward of the wheel axis, and axis 250 and axis 251 are preferably arranged in parallel.

Figure 6:
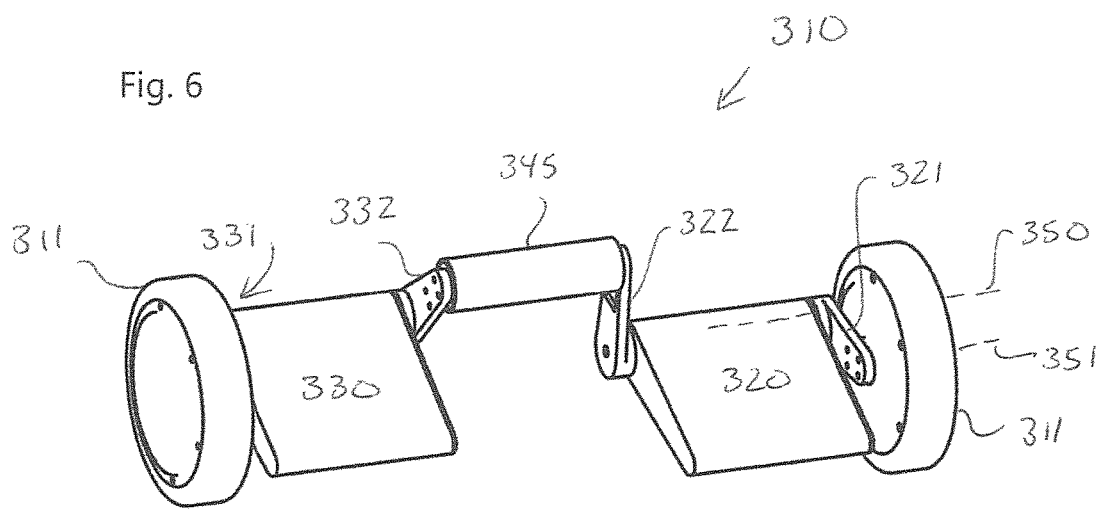
FIGS. 6-7 are perspectives view of yet another embodiment of a self-balancing transportation device with suspension in accordance with the present invention.
Figure 7:
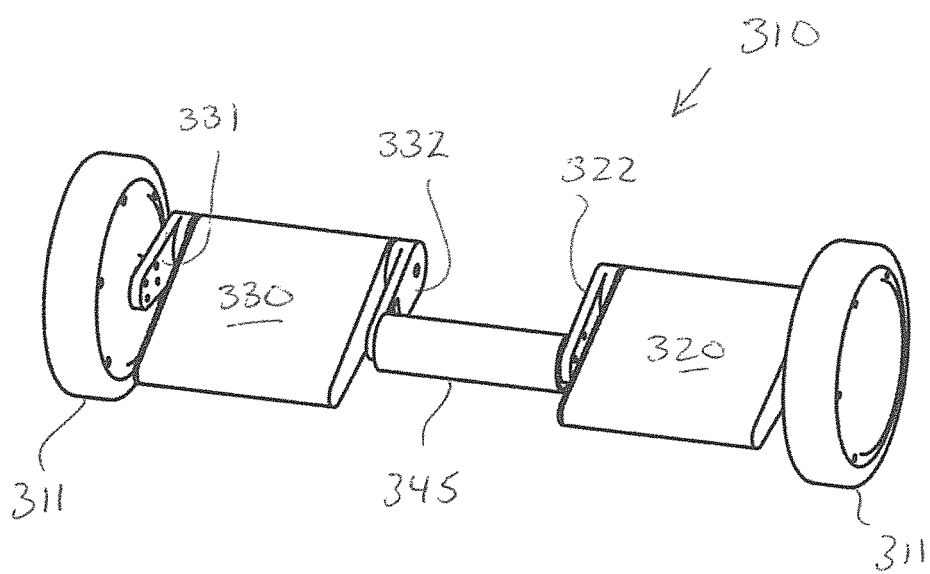

Referring to FIGS. 6-7, perspective views of yet another embodiment of a self-balancing transportation device 310 with suspension in accordance with the present invention are shown. Device 310 includes wheels 311, foot platforms 320,330 and attachment arms 321,331 arranged similar to that of device 10 and 210. Device 310, however, includes supplemental coupling arms 322 and a joining or bridge member 345.

Supplemental coupling arms 322,332 and bridge members are preferably arranged to maintain a substantially parallel relationship between the wheel and foot platforms, yet permit them to move fore-aft relative to one another such that a rider may "push" or "slide" one wheel forward of the other, thereby adding to the riding experience and permitting, for example, cracks in a pathway (such as typical sidewalk recesses) to be encountered one wheel at a time, which is far less de-stabilizing than both wheels at the same time, among other benefits.

Joining or bridge member 345 may also serve as a handle.

In any of the above embodiments, the spring(s) may be damped to absorb shock. Damping may be achieved using methods known in the art, such as by incorporating hydraulics or by adding low-rebound materials to the spring system.

While taught in devices have two foot platforms (one each for the right and left foot), the present invention may also be practiced in a self-balancing device having one platform used by both feet or in a seated or otherwise arranged self-balancing device. Important elements include an axis of angular movement or rotation for the platform or structure that bears the majority of the load (rider and/or cargo) that is space from the axis of rotation of the wheel(s).

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention claimed is:

1. A self-balancing device, comprising:
   a first wheel having a first wheel axis of rotation; and
   a first load platform associated with the first wheel;
   wherein the first wheel and first load platform are configured for fore-aft self-balancing operation of the first load platform;

wherein the first load platform is configured for angular movement in response to a shock force delivered to the wheel while the device is driven;

wherein the first load platform has a shock absorbing axis of rotation; and wherein the first load platform has a control axis of rotation and the control axis of rotation is non-collinear with the shock absorbing axis of rotation.

2. The device of claim 1, wherein the shock absorbing axis of rotation is one of forward or rearward of the first wheel axis of rotation.

3. The device of claim 1, wherein the first load platform is biased by a bias member to a default riding position, the presence of a sufficient shock force counter to the bias member force causing the first wheel to move relative to the first load platform.

4. The device of claim 1, further comprising a second load platform configured for angular movement, along a second shock absorbing axis of rotation, in response to a shock force delivered to the first wheel while the device is driven; and wherein the second shock absorbing axis of rotation is non-collinear with the first wheel axis of rotation.

5. The device of claim 1, further comprising a second wheel.

6. The device of claim 5, wherein the first load platform is located between the first wheel and the second wheel.

7. The device of claim 5, further comprising a second load platform associated with the second wheel and wherein the first and second load platforms are independently movable for respective control of the first and second wheels.

8. The device of claim 7, further comprising a coupling structure that couples the first and second platforms to one another in such a manner that a rider may move one load platform longitudinally forward of the other during use.

9. A self-balancing device, comprising:
a first wheel structure having a first wheel axis of rotation; and
a first load platform associated with the first wheel structure and having a fore-aft tilt control axis;

wherein the first wheel structure and first load platform are configured for driving the first wheel structure towards self-balancing the first load platform;

wherein the first load platform is configured for angular movement in response to a shock force delivered to the first wheel while the device is driven; and wherein the first load platform has a shock absorbing pivot axis and the shock absorbing pivot axis is non-collinear with the first wheel axis of rotation.

10. The device of claim 9, wherein the shock absorbing pivot axis is one of forward or rearward of the first wheel axis of rotation.

11. The device of claim 9, wherein the first load platform has a shock absorbing pivot axis and the shock absorbing pivot axis is not centered longitudinally in the first load platform.

12. A self-balancing device, comprising:
a first wheel having a first wheel axis of rotation; and
a first load platform associated with the first wheel;
wherein the first wheel and first load platform are configured for driving the first wheel towards balancing the first load platform;
wherein the first load platform is configured for angular movement about a shock absorbing pivot axis, and the shock absorbing pivot axis is located with the first load platform yet other than at the center, longitudinally, of the first load platform; and
wherein the shock absorbing pivot axis is one of forward or rearward of the first wheel axis of rotation.

13. The device of claim 12, wherein the shock absorbing pivot axis is non-collinear with the first wheel axis of rotation.

14. The device of claim 12, further comprising a second load platform configured for angular movement along a second shock absorbing pivot axis.

15. The device of claim 12, further comprising a second wheel.

* * * * *